United States Patent [19]

Laubach

[11] Patent Number: 4,761,149

[45] Date of Patent: Aug. 2, 1988

[54] ELK CALLING DEVICE

[76] Inventor: Donald R. Laubach, P.O. Box 127, Gardiner, Mont. 59030

[21] Appl. No.: 840,287

[22] Filed: Mar. 14, 1986

[51] Int. Cl.$^4$ .............................................. A63H 5/00
[52] U.S. Cl. ................................... 446/208; 446/205
[58] Field of Search ............... 446/202, 203, 204, 205, 446/206, 207, 208, 209

[56] References Cited

U.S. PATENT DOCUMENTS

| | | | |
|---|---|---|---|
| 209,274 | 10/1878 | Montagne | 446/208 |
| 333,094 | 12/1885 | Fuller | 446/208 |
| 726,277 | 4/1903 | Fuller | 446/208 |
| 1,052,525 | 2/1913 | Smith | 446/208 |
| 1,735,697 | 11/1929 | Rutkowski | 446/204 |
| 2,584,549 | 2/1952 | Carhart | 446/202 |
| 3,029,554 | 4/1962 | Mobley | 446/207 X |
| 3,579,903 | 5/1971 | Stewart | 446/208 |

FOREIGN PATENT DOCUMENTS

| | | | |
|---|---|---|---|
| 123839 | 1/1901 | Fed. Rep. of Germany | 446/207 |
| 615809 | 1/1949 | United Kingdom | 446/207 |

Primary Examiner—Robert A. Hafer
Assistant Examiner—D. Neal Muir
Attorney, Agent, or Firm—Richard C. Conover

[57] ABSTRACT

An animal calling device which has a reed member stretched between two generally rectangular members which are bowed at each end in a direction perpendicular to a longitudinal axis and positioned with the concave sides opposing one another to form a double-tapered cavity. The two rectangular members are constructed of resilient material and are hinged together along corresponding longitudinal edges thereof. A pair of notches are positioned at each end of one of the members and an endless rubber band is positioned across the outer back side of the member with notches and through the notches thereby forming two reed elements, one at each end of the device. The reed elements are positioned at the entrance into the cavity between the two members at each end thereof.

3 Claims, 2 Drawing Sheets

ELK CALLING DEVICE

BACKGROUND OF THE INVENTION

This invention relates to a device for calling or attracting the attention of elk or other wild animals by game hunters. The invention has particular application in imitating the whistles of elk as they apparently communicate with one another in the wild.

There are several deer calls known in the art. For example, U.S. Pat. No. 2,470,823 to Luch and Canadian Pat. No. 520,645 to Carhart both show calling devices. The Luch reference discloses a deer call constructed of two elongated members. The two members are elastically joined together with a support at a corner of the two members in such a manner as to leave an elongate cavity between the members. An endless rubber band is stretched around one of the members parallel to the longitudinal axis of the member and extends through the elongate cavity between the two members. By blowing into the cavity between the members, the rubber band is caused to vibrate thereby causing a sound to be formed. The pitch of the sound can be varied by compressing the two members together to vary the size of the cavity between the two members, the support acting as a fulcrum.

The Canadian Patent to Carhart describes another deer call comprising two relatively flat elongate members which are positioned facing one another in opposing relation. Each member has a carved out concave portion. These concave portions are positioned in face-to-face relation to form an elongate cavity between the two members. A rubber band is disposed around the two members to hold the members together and has a portion disposed within the elongate cavity to form a reed. A deer call sound is made by blowing into the cavity. To vary the pitch of the sound of this instrument the rubber band is stretched to the extent desired for a particular sound.

Further there are various toy musical instruments which are known such as described in British patent specification No. 615,809 which describes a toy squeaker having a pair of plates formed so that when positioned facing one another, a passage is defined. A first rubber band is wrapped around the pair of plates and has a portion thereof disposed within the passage to form a reed element. A second rubber band is used to hold the plates together. The plates may be tilted relating to one another with the portion of the first rubber band passing between the edge portions of the plates providing aligned pivots or fulcrums about which the plates pivot.

SUMMARY OF INVENTION

The present invention is an improved calling device for calling elk and is especially adapted to imitate the whistle sound which elk make in the wild. The significance of the present invention is that it provides an improved, simple and inexpensive calling device which is of a small size and which can be carried in a pocket and operated easily by a hunter or other person seeking game without having much experience in using the device. At the same time the device provides a game calling instrument which closely imitates the whistles of an elk.

The present invention utilizes an elongate reed element which is stretched between two generally rectangular members which have been bowed along their longitudinal axes and positioned with the concave sides opposing one another to form a double-tapered cavity, transverse to the longitudinal axes, between the two members in which the reed element is positioned. The two rectangular members are flexible and resilient. To use the device a user inserts one end of the device in his mouth and bites down on the two members. The two members are squeezed together and the cavity between the two members is made smaller in size. The user begins to blow through the device and releases the pressure on his teeth. The initial pitch of the resulting whistle-like sound is high pitched because of the small cavity. As the pressure on the members is decreased, the cavity becomes larger and the pitch of the whistle-like sound decreases in a smooth manner. The resulting high pitch whistle which starts out with a high pitch and then drops in pitch in a smooth manner as the pressure on the teeth is decreased, closely imitates the whistle of an elk in the wild.

BRIEF DESCRIPTION OF THE DRAWINGS

In order that the invention may be clearly understood and readily carried into effect, preferred embodiments of the invention will now be described, by way of example only, with reference to the accompanying drawings wherein.

DESCRIPTION OF PREFERRED EMBODIMENTS

Figure 1:
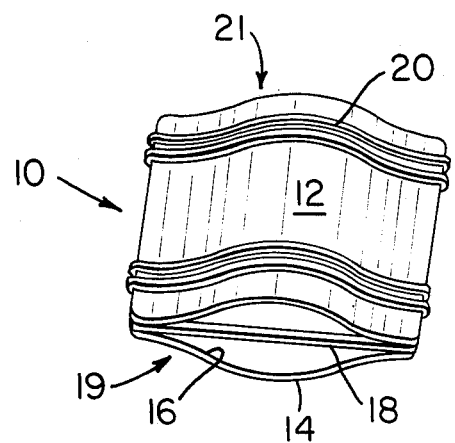
FIG. 1 is a perspective view of the calling device of a first embodiment of the present invention.

The first embodiment of the present invention is shown in FIG. 1 wherein there is shown a calling device 10 including a pair of rectangular, substantially coextensive, planar members 12 and 14 which are constructed of a resilient material such as plastic and which are slightly bowed in shape at each end thereof in a direction perpendicular to their longitudinal axes thereof. The members 12 and 14 are positioned facing one another with their concave bow sides positioned opposing one another to create an elongate double-tapered cavity or passage designated as at 16 between them and extending in a direction perpendicular to the longitudinal axes of the two members. A first rubber band 18 is positioned adjacent a first end 19 of device 10 and a portion of the rubber band is wrapped around the member 12 to extend through the elongate cavity 16 to provide a reed element for the subject calling device. A second rubber band 20 is located adjacent a second end 21 of the device 10 transversely to the longitudinal axes of the two members 12 and 14 to hold the two members 12 and 14 together.

In order to use the calling device, the user inserts the end of the calling device with the reed element in his mouth and positions his teeth between the first rubber band 18 and the first end 19 of device 10. The user then forces the two members 12 and 14 together by applying pressure with the user's teeth. This has the effect of closing the cavity 16 from the outer edges of the cavity towards the center with the rubber band 18 pinched in between the two members 12 and 14 and of spreading apart the members 12 and 14 at the second end 21 of the device against the resilient force of rubber band 20. The portions of first rubber band 18 extending between the longitudinal edges of members 12 and 14 act as a fulcrum about which members 12 and 14 pivot.

The user then builds up air pressure behind the device in the mouth and slowly releases the pressure between the teeth. Since the members 12 and 14 are resilient the cavity 16 begins to be restored. With a cavity 16 small in size, a high pitch whistle results. As the pressure on the members 12 and 14 is reduced, the size of the cavity 16 increases and the members 12 and 14 adjacent second end 21 are forced together by the resilient force of rubber band 20 and the pitch of the whistle drops.

The tension on the portion of the rubber band 18 which acts as a reed element is adjusted by the user to a desired extent. In using this device, a user can very closely imitate the whistle of an elk.

Figure 2:
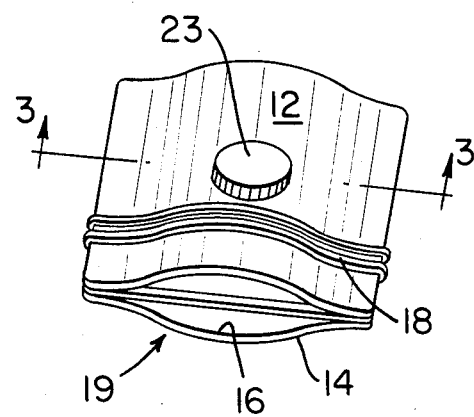
FIG. 2 is a perspective view of a second embodiment of the present invention.
Figure 3:
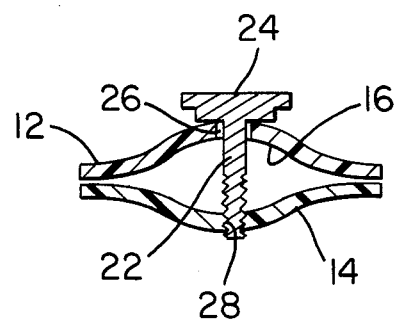
FIG. 3 is a cross-sectional view along the line 3—3 in FIG. 2.

A second embodiment of the present invention is shown in FIGS. 2 and 3. In this embodiment, the two members 12 and 14 are again used. The rubber band 18 is also used and is positioned as before adjacent a first end 19 of the device. This rubber band 18 provides a means for holding the two members 12 and 14 together and also provides a reed element located in the elongate passage 16 between the two members. However, in this embodiment, the rubber band 20 is eliminated.

In this embodiment, a pitch adjustment 23 screw is provided which has a threaded shaft portion 22 and a head portion 24. The threaded shaft portion 22 is positioned through a bore 26 in member 12 into cavity 16 and the head position 24 is positioned on the side of member 12 opposite cavity 16. The bore 26 is sized to freely receive the threaded shaft portion 22. The threaded shaft portion 22 is then threadably received by a threaded bore 28 in member 14. Thus when the head 24 is turned, the members 12 and 14 can be drawn closer to one another. With this pitch adjustment screw, the rate of the drop in pitch of the resulting whistle can be adjusted.

As with the first embodiment a user inserts the first end of the calling device with the reed element in his mouth and forces members 12 and 14 together with his teeth. This again has the effect of closing the cavity 16 with the rubber band 18 in between the members 12 and 14 and spreading apart the members 12 and 14 adjacent a second end 21 of the device opposite the first end 19 of the device. The rubber band 18 extending between the longitudinal edges of members 12 and 14 acts as a fulcrum about which members 12 and 14 pivot.

The user then builds up air pressure behind the device in the mouth and slowly releases the pressure between the teeth. Since the members 12 and 14 are resilient, the cavity 16 begins to be restored. Further the ends of members 12 and 14 adjacent the second end 21 of the device which have been spread apart begin to close because of the members 12 and 14 being resiliently pinched together between the head portion 24 and the threaded shaft portion 22 threadably received by bore 28. As the cavity 16 increases in size, the pitch of the whistle sound drops as before. The ending rasp note as well as the rate of the drop in pitch of the whistle sound can be adjusted with the pitch adjustment screw 23.

A third embodiment is shown in FIGS. 4 through 7. In this embodiment, a pair of rectangular, substantially coextensive and planar members 30 and 32 are hingedly joined along one edge 33 thereof as with rubber cement. These members are bowed slightly in a direction perpendicular to their longitudinal axes at corresponding ends thereof with an approximately flat portion 29 of the members separating the bows at the ends thereof. The concave portions of the bows of these members are positioned opposing one another to create a pair of throats 35 and 37, each of which serves the same purpose as cavity 16 of the first embodiment. Further, when the members 30 and 32 are squeezed together with the teeth of the user as with the first and second embodiments, the ends of the members 30 and 32 opposite to the ends being squeezed are spread apart. The free corners 31 of the members 30 and 32 adjacent the teeth of the user act as a fulcrum about which the members 30 and 32 pivot. Further the throat 35 or 37 which is being squeezed is reduced in size as before when pressure is applied to members 30 and 32. As the pressure applied to members 30 and 32 is reduced the ends which are spread apart come back together as a result of the members 30 and 32 being constructed of resilient material and being hinged along edges 33 thereof. In addition, the throat 35 or 37 which is being squeezed is restored to its normal size as pressure is reduced.

The member 30 further includes two spaced apart and parallel slits 36 and 38 formed along one edge of the member 30 at first end 39 of the device, the slits 36 and 38 being parallel to the longitudinal axis of member 30. These slits are approximately the same length and are sized to receive a rubber band. Another pair of spaced apart and parallel slits 40 and 42 are formed at the opposite edge of the elongate member 30 at a second end 41 of the device. These slits are also sized to receive a rubber band.

Figure 4:
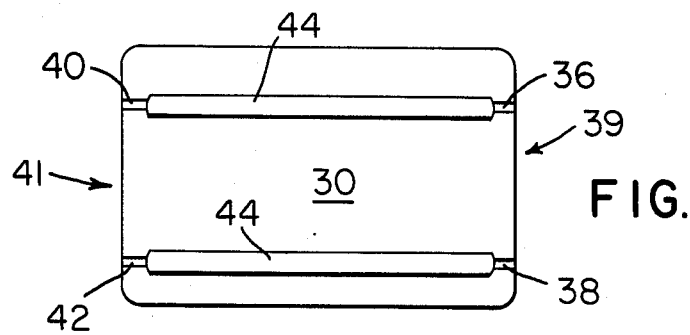
FIG. 4 is a top view of a third embodiment of the present invention.
Figure 5:
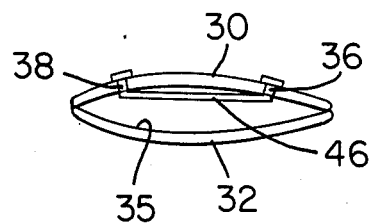
FIG. 5 is a right hand side view of the calling device showing FIG. 4.
Figure 6:
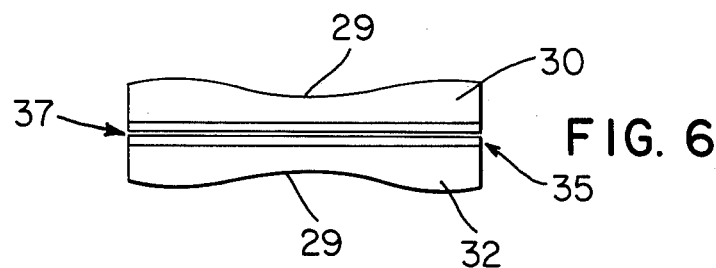
FIG. 6 is an elevational view of the calling device shown in FIG. 4 with the elastic band removed.
Figure 7:
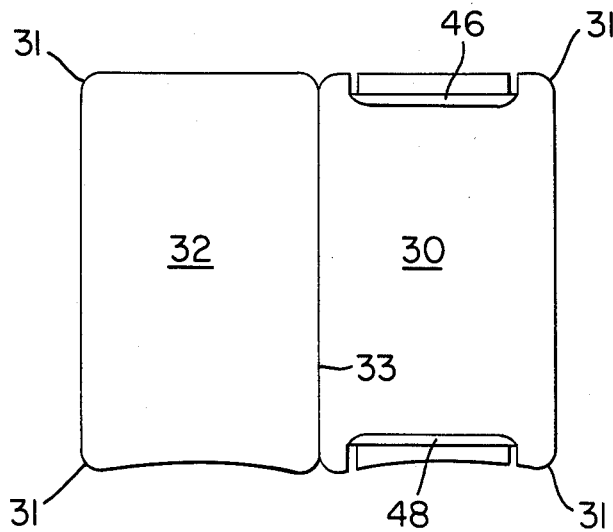
FIG. 7 is a view of the third embodiment of the present invention shown in FIG. 4 with the members opened and flattened out.

A rubber band 44 is looped along the outside surface of member 30 and then the ends of the loop are drawn through the slits 36, 38 and 40, 42 as shown in FIGS. 4 and 5 to form a pair of reed elements 46 and 48 within throats 35 and 37 respectively. In this embodiment, the reed element at one end of the device is stretched between the corresponding pair of slits to provide a whistle sound to imitate a cow elk, for example, and the reed element at the other end is stretched to imitate a calf elk, for example.

With this third embodiment, the device is used similarly to the first and second embodiments. However, with this embodiment, both a cow elk and a calf elk can be closely imitated with the same instrument without making further adjustments. This embodiment has a further advantage that the members 30 and 32 can be opened along hinge 33 so that the interior of the calling device can be cleaned. In order to adjust the pitch of the call, the reed elements are stretched between their respective slits so that the proper pitch can be obtained. As before a user squeezes the members 30 and 32 together with his teeth to institute the call. The user then releases pressure to create a drop in pitch which simulates an elk whistle.

With the present invention, the whistle of a cow or calf elk can be very closely imitated. The above-described embodiments of this device are simple to construct and easy to use and can be easily carried by the hunter or other person seeking game in the wilderness. It is not complicated to use such as many of the other elk calling devices on the market today and it is very effective in imitating the respective calls.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. An improved elk calling device comprising:
   a pair of rectangular, substantially coextensive, planar members with a longitudinal axis;
   the members being bowed perpendicular to said longitudinal axes longitudinal axes thereof and positioned opposing one another with their open concave sides facing one another and flared to form a double-tapered cavity sandwiched between the two members, said cavity extending in a direction parallel to the longitudinal axes of the two members with a flared opening at each end of said longitudinal axes;
   a first endless elastic band encircling the two members in a direction transverse to the longitudinal axes thereof and at a position adjacent but spaced from a first end of the device;
   a second endless elastic band means encircling the two members in a direction transverse to the longitudinal axes thereof and at a position adjacent a second end of the device for resiliently holding the two members together, the second end being opposite the first end of the device;
   the first endless elastic band further having a portion of the band disposed in the double-tapered cavity, which portion comprises a reed element for the device;
   the two resilient members being further adapted so that when the two members are squeezed together at the first end of the device, the members at the second end of the device are caused to separate because the portions of the first elastic band extending between the two members at the longitudinal edges thereof act as a fulcrum about which the two members pivot;
   the two resilient members further being constructed of flexible and resilient material and further adapted so that when the two members are squeezed together at the first end of the device, the size of the double-tapered cavity is substantially reduced beginning at the ends of the double-tapered cavity and working towards the center of the cavity and when pressure on the two members is released, the size of the double-tapered cavity is restored to its normal size.

2. An improved elk calling device comprising:
   first and second rectangular, substantially coextensive, planar members each with a longitudinal axis;
   the first and second members being bowed perpendicular to said longitudinal axes thereof and flared so that when positioned opposing one another with their open concave sides facing one another a double-tapered cavity is formed sandwiched between the two members extending in a direction parallel to the longitudinal axes of the two members with a flared opening at each end of said longitudinal axes;
   an endless elastic band encircling the two members in a direction transverse to the longitudinal axes thereof and in a position adjacent but spaced from a first end of the device for resiliently holding the two members together;
   the endless elastic band further having a portion disposed in the double-tapered cavity which portion comprises a reed element for the device;
   a first bore positioned in the first planar member;
   a pitch adjustment screw having a head portion positioned on the side of the first member opposite the cavity and a threaded shaft portion;
   the threaded shaft portion being positioned to extend through the first bore, which is sized to freely accommodate the threaded shaft portion;
   further the threaded shaft portion being threadably received by a threaded second bore formed in the second planar member, the second bore being aligned with the first bore, whereupon by turning the head of the pitch adjustment screw, the first and second members may be compressed towards one another;
   the first and second members being adapted so that when the two members are squeezed together at the first end of the device, the members at a second end of the device, opposite to the first end of the device, are caused to separate because the portions of the endless elastic band extending between the two members at the longitudinal edges thereof act as a fulcrum about which the two members pivot;
   the first and second members being constructed of flexible and resilient material and further adapted so when the two members are squeezed together at the first end of the device, the size of the double-tapered cavity is reduced beginning at the ends of the double-tapered cavity and working towards the center of the cavity and when pressure on the two members is released, the size of the double-tapered cavity is restored to its normal size.

3. An improved elk calling device comprising:
   first and second rectangular, substantially coextensive, planar members each with a longitudinal axis;
   the first and second members being bowed perpendicular to said longitudinal axes and flared at their longitudinal ends thereof, the bows being separated by an approximately flat portion of the members, the bowed portions being positioned opposing one another with their open concave sides facing one another to form a pair of double-tapered throats rear the first and second longitudinal ends of the device sandwiched between the first and second members extending in a direction parallel to the longitudinal axes of the two members;
   the first and second members being hingedly joined along corresponding longitudinal edges thereof;
   the first member having a first pair of spaced apart and parallel slits located adjacent a first transverse edge of the first member at the first longitudinal end of the device, the slits extending in a longitudinal direction;
   the first member having a second pair of slits located at the second longitudinal end of the device adjacent a second transverse edge of the first member at a second end of the device opposite the first end, which slits are spaced apart and parallel and extend in a longitudinal direction;
   an endless elastic band looped along the outside surface of the first member with the ends of the loop drawn through the slits to form a pair of reed elements within the cavity at opposite ends of the device;

the first and second members being adapted so that when the two members are squeezed together either at the first or the second end of the device, the first and second members at the opposite end of the device are caused to be spread apart with the unhinged corners of the two members at the end of the device being squeezed acting as a fulcrum about which the two members pivot;

the two resilient members further being constructed of flexible and resilient material such that when the two members are squeezed together, the size of the double-tapered cavity is substantially reduced beginning at the ends of the double-tapered cavity and working toward the center of the cavity and when pressure on the two members is released, the size of the double-tapered cavity is restored to its normal size.

* * * * *